United States Patent [19]

Tinnerman

[11] 3,841,196

[45] Oct. 15, 1974

[54] QUICK-ACTING CLAMP

[76] Inventor: George August Tinnerman, 3600 Stewart Ave., Miami, Fla. 33133

[22] Filed: Oct. 31, 1972

[21] Appl. No.: 302,599

[52] U.S. Cl................ 85/36 R, 24/81 G, 24/243 Q, 24/249 SA, 403/322
[51] Int. Cl............................................ F16b 37/04
[58] Field of Search...... 85/36, 32 V; 248/327, 113; 211/66; 24/132 AB, 132 SB, 134 EA, 81 B, 81 G, 81 LC, 81 WR, 155 BB, 243 Q, 249 SA; 403/322, 325, 329

[56] References Cited
UNITED STATES PATENTS

| | | | |
|---|---|---|---|
| 1,540,291 | 6/1925 | Sessions | 24/249 SA |
| 2,112,995 | 4/1938 | O'Keefe | 24/243 Q |
| 2,697,862 | 12/1954 | Flora | 24/257 R |
| 2,715,350 | 8/1955 | Bedford | 85/36 |
| 2,968,850 | 1/1961 | Tinnerman | 24/81 G |
| 3,108,828 | 10/1963 | Kus | 24/81 B |

FOREIGN PATENTS OR APPLICATIONS 285,577   2/1966   Australia........................... 248/327

*Primary Examiner*—Marion Parsons, Jr.

[57] ABSTRACT

A one-piece, sheet metal quick-acting clamp is formed for attachment to a supporting structure and carries an apertured plate element through which a vertical rod may pass. The edge of the aperture on one side and a tooth and resilient lever element on the opposite side engage the rod to prevent downward movement of the rod. The lever element is formed so that pressure on the lever element withdraws the tooth from engagement with the rod and the aperture is sufficiently wide to allow the rod to move.

7 Claims, 3 Drawing Figures

PATENTED OCT 15 1974 3,841,196

QUICK-ACTING CLAMP

NATURE AND OBJECTS OF INVENTION

This invention relates to a quick-acting clamp for engaging and supporting a rod, especially a vertical rod used for suspending various structural elements and fixtures.

The invention resides in a one-piece, sheet metal clamp made of a single piece of sheet metal which may be stamped out and bent to shape. This fastener is formed with a supporting wall to secure to a structure and a horizontal plate element having an aperture to receive a vertical rod which is used to suspend various articles, fixtures or panel elements.

DRAWINGS

GENERAL DESCRIPTION

Figure 2:
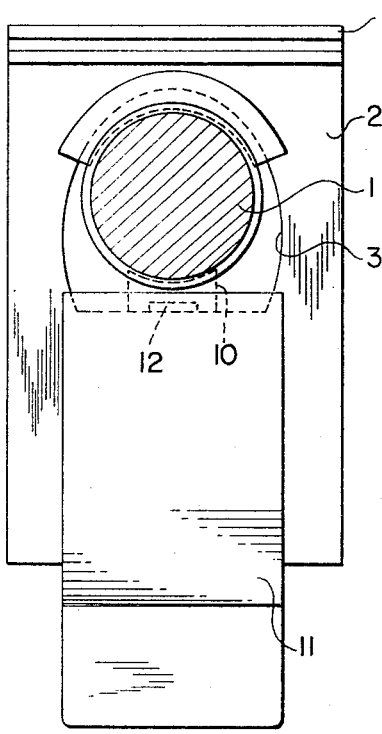
FIG. 2 is a top plan view of the fastener with the rod shown in section.
Figure 1:
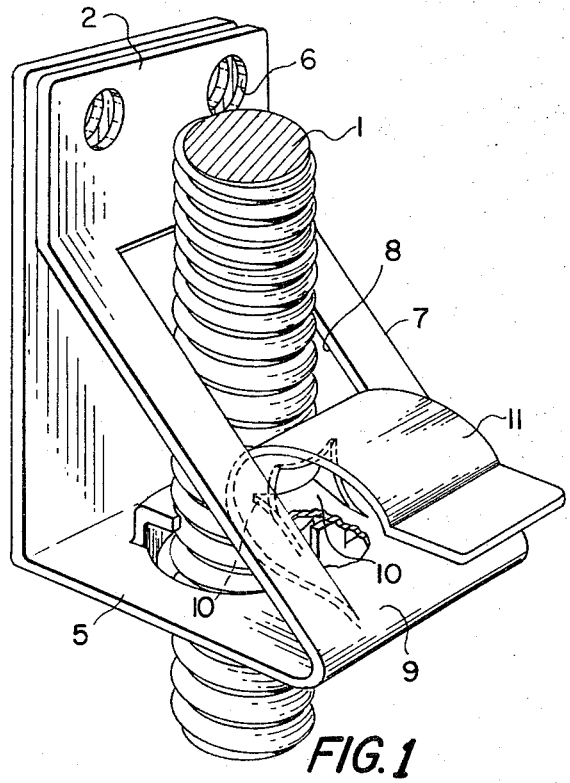
FIG. 1 is an isometric view of the fastener of this invention with a rod held by the clamp.
Figure 3:
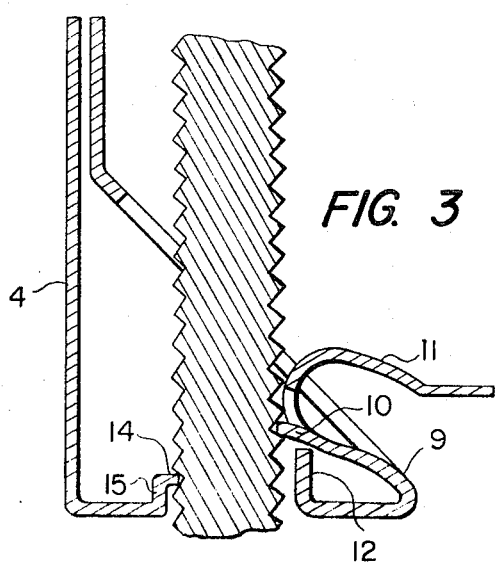
FIG. 3 is a vertical sectional view of the fastener.

The rod 1 is shown as supported by the clamp 2, the clamp 2 having an aperture 3 through which the rod passes. The clamp 2 has a rear support wall element 4, is bent to form the plate element 5 with aperture 3. At the front side of plate 5, the strip is bent upwardly and rearwardly to form an inclined wall 7, terminating in a vertical end wall contiguous to rear wall 4, openings 6 in the two walls providing for fastening the clamp to a support.

The front wall 7 is cut out at 8 to provide a lever element 9 extending rearwardly toward the aperture, leaving a space between its sides 8 for the rod 1. A tooth 10 is struck out from the lever and extends over the aperture to engage rod 1. The lever 9 beyond the tooth 10 is reversely bent forwardly to form the actuating portion 11, which is depressed to withdraw tooth 10.

The aperture 3 is wider from back to front than the diameter of rod 1, and an upright lug 12 is formed at the front edge of the aperture. At the rear side of the aperture, a second upstanding lug 15 has a radially directed flange or edge 14 curved to engage the rod 1. The lug 12 is closely spaced from tooth 10, so that under sufficient downward force, the tooth will engage the lug 12 to sustain the force applied and avoid distortion of the tooth.

In the specific form illustrated, the rod is threaded, and the edge 14 and tooth 10 engage the threads. The tooth 10 may be disengaged from the threads by depressing end 11 of lever 9 fulcruming it about its integral connection to plate 5. The rod may then be moved forwardly against the lug 12 and disengaged from the edge 14, and moved up or down in the clamp. The rod may also be adjusted by rotation, thereby threading the rod on the tooth 10 and edge 14.

A smooth rod may also be used in the same type of clamp 2. Preferably, the tooth 10 and edge 14 will be sharp and hardened, so they will bite into the rod more firmly. If the tooth 10 and edge 14 are also formed in a spiral surface, that is, conform to threads as those on the rod 1, a smooth rod may also be adjusted by rotation of the rod, the hardened sharpened edges cutting into the rod to form spiral grooves.

It is also preferable to harden the material of the entire clamp, thereby providing greater resilience in the lever. The hardened clamp will also ensure better engagement of the tooth with the rod.

SUMMARY

The clamp is fastened to a supporting structure by fasteners in the holes 6, either directly or through clips secured to the clamp. The rod may be pushed up through the aperture to the desired position, the tooth 10 and edge 14 preventing downward movement. After installation, the rod is adjusted by depressing lever 9 by actuating portion 11 to disengage the tooth 10 and moving the rod in either direction. Accurate adjustment may also be made by rotating the rod, when the rod is threaded. Any excessive downward force will be sustained by engagement of tooth 10 with lug 12.

While shown as used to support a vertical rod, the same type of clamp may be used to engage a rod in any position. The clamp 2 will be fixed and the lever 9 actuated to allow positioning of the rod in the same manner.

I claim:

1. A one-piece, sheet metal quick-acting, rod-engaging clamp comprising a sheet metal member having a supporting element, a substantially horizontal plate element extending from said supporting element and having an aperture therein, and a lever element bent at an angle on one side of said plate element upwardly and toward said opening, said lever element having a tooth struck out from said lever and inclined upwardly and extending over the edge of said aperture to engage a rod in said aperture, said lever element extending beyond said tooth to form a lever arm and being movable away from said opening to withdraw said tooth from engagement with said rod, the opposite side of said aperture being formed with an inwardly directed edge to engage a rod in said aperture, the width of said aperture between said inwardly directed edge and the side adjacent said tooth being greater than the diameter of the rod, so that when said tooth is withdrawn by movement of said lever, the rod may be disengaged from the edge of said aperture and moved relative to said clamp.

2. A clamp as claimed in claim 1, in which said aperture is provided with an upstanding lug perpendicular to the plate opposite said edge, so that the rod may be moved without engaging the opposite edge of the aperture when the lever withdraws said tooth from engagement with said rod.

3. A clamp as claimed in claim 2, in which the edge is formed on a lug perpendicular to the plate and is directed radially inwardly to engage the rod, said edge being arcuate to conform to the rod.

4. A clamp as claimed in claim 2, in which said tooth overlies and is closely spaced from said lug, so that said tooth engages said lug under sufficient force on said rod.

5. A clamp as claimed in claim 4, in which the metal of said clamp is hardened to provide resiliency and to increase engagement with said rod.

6. A one-piece, sheet metal, quick-acting clamp for engaging and supporting a vertical rod comprising a vertical wall for attachment to a supporting structure, a substantially horizontal plate element extending from said wall and having an aperture therein to receive a vertical rod, one side of said aperture being formed with an inwardly directed edge to engage a rod in the aperture, the width of said aperture between said edge and the opposite side being greater than the diameter of the rod so that the rod may be moved freely in said aperture, a lever element integral with the side of said plate opposite the said edge of said aperture and bent upwardly and toward said aperture, said lever element having a tooth struck out from the material of the lever and extending over the side of the aperture directly opposite said edge, said plate having an upstanding lug on said last-named edge of said aperture underlying and closely spaced from said tooth to limit downward movement of said tooth and a rod in engagement therewith, said lever being bent reversely away from said aperture in substantially a horizontal direction, so that pressure downwardly on the end of said lever withdraws said tooth from engagement with said rod and allows said rod to be disengaged from said edge of said aperture and moved through the aperture.

7. A clamp as claimed in claim 6, in which the said edge is formed on an upstanding lug on the side of the aperture opposite said tooth.

* * * * *